US005209443A

United States Patent [19]

Maddox

[11] Patent Number: 5,209,443

[45] Date of Patent: May 11, 1993

[54] FOLDABLE STAND FOR HOLDING MUSICAL INSTRUMENTS AND BLANKS FOR FORMING SAME

[76] Inventor: Ralph L. Maddox, 1829 Scarborough, Olathe, Kans. 66062

[21] Appl. No.: 788,794

[22] Filed: Nov. 2, 1991

[51] Int. Cl.$^5$ .......... F16M 11/00

[52] U.S. Cl. .......... 248/165; 108/153; 211/132; 211/133; 211/195; 248/174

[58] Field of Search .......... 248/165, 166, 174, 150, 248/152; 211/72, 132, 133, 195; 108/115, 153, 154, 155, 156, 157

[56] References Cited

U.S. PATENT DOCUMENTS

| | | | |
|---|---|---|---|
| 1,881,224 | 10/1932 | Nuckols | 248/174 |
| 2,012,117 | 8/1935 | Barron | 211/72 X |
| 2,041,751 | 5/1936 | Folsom et al. | 248/174 |
| 2,043,483 | 6/1936 | Lynch | 248/174 |
| 2,043,791 | 6/1936 | Barron | 211/133 X |
| 2,152,609 | 3/1939 | Stevenson et al. | 248/174 X |
| 2,229,257 | 1/1941 | Reaume | 248/174 |
| 3,837,719 | 9/1974 | Barron | 248/174 X |
| 4,374,560 | 2/1983 | Howlett | 248/174 X |

*Primary Examiner*—Ramon O. Ramirez
*Assistant Examiner*—Derek J. Berger

[57] ABSTRACT

A lightweight stand for holding musical instruments is formed from first and second unitary blanks made of cardboard, paperboard or similar material. The assembled stand includes a pair of spaced apart legs and a tray for holding an instrument such as a xylophone at a height which is convenient for a musician who is seated. The stand also includes a pair of foldable shelves which may be extended to positions in which they support the xylophone at an elevated height desirable for a standing musician.

16 Claims, 4 Drawing Sheets

FOLDABLE STAND FOR HOLDING MUSICAL INSTRUMENTS AND BLANKS FOR FORMING SAME

BACKGROUND OF THE INVENTION

This invention relates in general to stands for holding musical instruments and, more particularly, to a lightweight and foldable stand for holding such instruments and blanks for forming same.

Stands for holding instruments such as certain types of xylophones having a deep resonance box are typically made of wood, steel or other types of rigid but heavy material. Such stands are generally very expensive and add significantly to the costs incurred by students and others desiring to play the particular instrument. Because of the expense of such stands, the musician usually only purchases one stand even though he may need one for practicing the instrument at home and one for playing the instrument at school or a performance hall. Moreover, the weight and bulk of such stands prevents them from being readily transported between practice and performing locations. As a result of these factors, the musioian may be forced to utilize a makeshift type of stand at one of those locations. A common problem with using such a stand is that it may not allow the instrument to be placed at the height desired for playing the instrument. A need has thus arisen for a music stand which may be easily transported and which is less expensive than stands currently used for holding musical items.

SUMMARY OF THE INVENTION

It is an object of this invention to provide a stand for holding musical items such as xylophones, which stand is sufficiently rigid to provide stable support for the musical item but is of lightweight construction so that it may be readily transported between practice and playing locations.

It is also an object of this invention to provide a stand for holding xylophones or other musical items and which is formed of cardboard or similar materials so that it is far less expensive to manufacture than stands made of materials such as wood or steel.

It is a further object of this invention to provide a music stand which can support a xylophone at two different levels so that the stand may be used to support the xylophone at the proper height while the musician is standing up as well as when the musician is sitting down.

It is another object of this invention to provide a musical instrument stand which may be folded flat for storage purposes as well as to facilitate transport of the stand.

It is still another object of this invention to provide two blanks of paperboard or similar material which may be folded and joined together to form a musical instrument stand in a manner which provides a rigid platform for the instrument yet is very inexpensive because of the use of paperboard in its construction.

To accomplish these and other related objects of the invention, in one aspect the invention relates to a stand formed of folded paperboard or similar material and having a tray supported by spaced apart legs, said stand comprising:

generally flat outer end panels forming first and second ends of the tray and at least a portion of said legs, said outer end panels formed by folding a unitary blank of paperboard or similar material;

front and back panels connected to the outer end panels along fold lines and forming a front and back of the tray; and a bottom panel connected to one of said front and back panels along a fold line and forming at least a portion of a bottom of the tray.

Another aspect of the invention is directed to inner end panels disposed within the tray and connected to said outer end panels at said first and second ends along fold lines, said inner end panels including spaced apart hinge lines permitting a shelf to be formed in each of said inner end panels and placed in a generally horizontally extended position and wherein said hinge lines permit said shelf to be moved to a retracted position.

In a further aspect, the invention pertains to the blanks used to construct said stand, one of said blanks being of unitary paperboard construction for folding to form the portion of the stand comprising a tray supported by spaced apart legs, said one blank comprising:

a first generally rectangular outer end panel having opposed side edges and opposed top and bottom edges, said outer end panel forming an end of said tray and a portion of one of said legs when said blank is folded to form said stand;

a second generally rectangular outer end panel having opposed side edges and opposed top and bottom edges, said second outer end panel forming another end of said tray and a portion of the other of said legs when said blank is folded to form said stand;

a front panel connected at one end thereof to a portion of one of said side edges of said first outer end panel along a first fold line, the other end of said front panel being connected to a portion of the one of said side edges of said second outer end panel along a second fold line;

a rear panel connected at one end thereof to a portion of the other of said side edges of said first outer end panel along a third fold line, said rear panel being connectable at the other end thereof to a portion of said other side edge of said second outer end panel when said blank is folded to form said stand, wherein said front and rear panels form the front and rear sides of said tray;

a first inner end panel connected to said top edge of the first outer end panel along a fourth fold line and foldable to form an inner end of said tray;

a second inner end panel connect to said top edge of the second outer end panel along a fifth fold line and foldable to form another inner end of said tray, said first and second inner end panels including spaced apart hinge lines for forming extendable and retractable shelves within said tray when the blank is folded to form said stand.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENT

Figure 1:
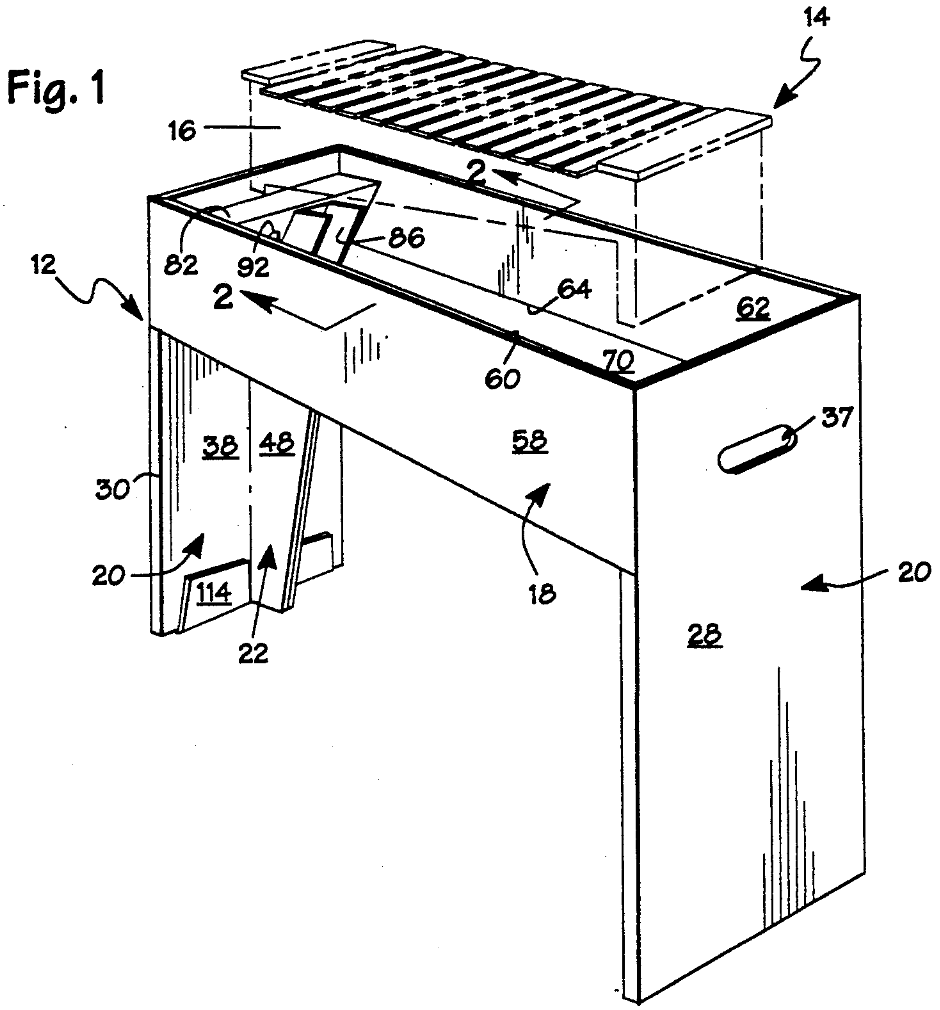
FIG. 1 is an end perspective view of a stand in accordance with the present invention and with a xylophone shown in phantom lines above the stand to illustrate one type of instrument that may be supported by the stand.
Figure 4:
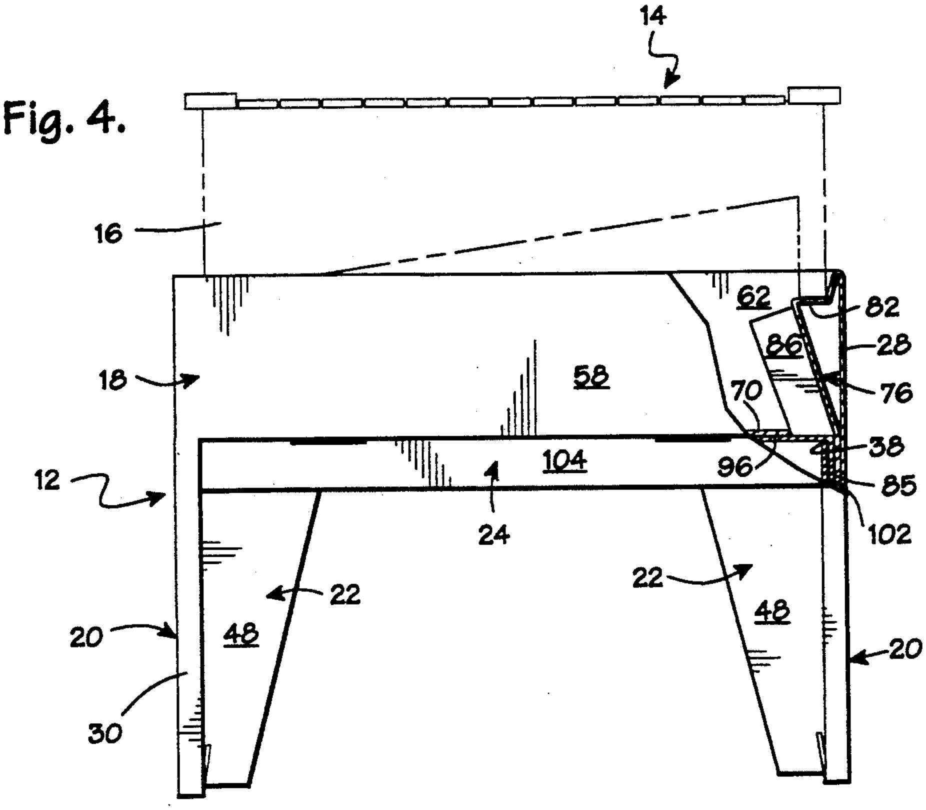
FIG. 4 is a front elevational view of the stand with a portion broken away for purposes of illustration and with the xylophone shown in phantom lines resting on a shelf of the stand.

Referring now to the drawings in greater detail, and initially to FIG. 1, the numeral 12 broadly designates a foldable stand in accordance with the present invention which may be used to support a musical instrument such as a xylophone 14 of the type having a deep resonance box 16. In general, the stand 12 has a deep tray portion 18 which is supported by two spaced apart legs 20. As can be seen in FIG. 4, two braces 22 are connected to the legs 20 and a support beam 24 extends between the braces to brace the legs as well as to support the tray portion 18.

Figure 7:
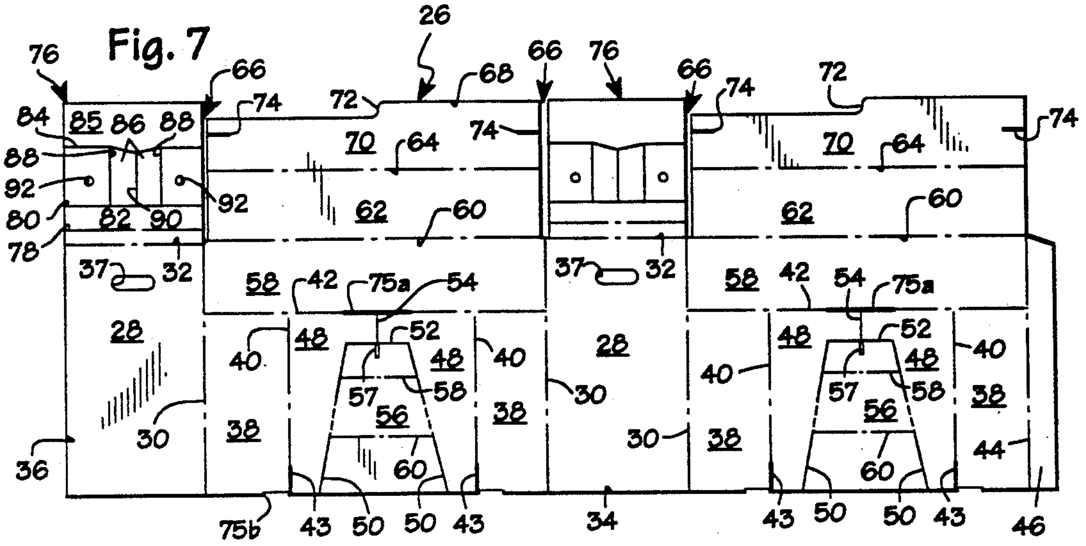
FIG. 7 is a top plan view on a reduced scale of a flat blank which may be folded to form a portion of the stand in accordance with the present invention.

Turning additionally to FIG. 7, the stand 12 may be formed in part from a first flat blank 26 made of paperboard or like .material. Blank 26 includes panels 28 which form the outer ends of the stand 12 and are of a rectangular shape defined by upright major fold lines 30, a transverse fold line 32 and the bottom edge 34 of the blank. One of the end panels is positioned at a side edge 36 of the blank and is defined in part by that edge 36. Both end panels include handle cutouts 37.

An inner portion of the both legs 20 is formed by smaller leg panels 38 which are connected along fold lines 30 with the taller outer panels 28. The inner leg panels 38 are of a rectangular configuration defined along their major dimension by fold line 30 and a parallel major fold line 40 and along the minor dimension by bottom edge 34 and a cut line 42 shared by two of panels 38. A series of slots 43 extend upwardly along fold lines 40 from the bottom edge 34 of the blank 26.

One of the leg panels 38 is formed at the opposite side of the blank from edge 36 and is defined in part by a fold line 44 which is similar to fold lines 30. A glue tab 46 is joined to that panel along fold line 44 and is used in part to connect such panel to the outer end panel 28 formed along side 36 when the blank is folded in a manner which will subsequently be described.

Each leg panel 38 is connected to a leg brace panel 48 which shares fold line 40 with the associated leg panel. Two leg braces 48 are formed in each of two regions of the blank lying between the panels 38. Brace panels 48 are likewise defined in part .by cut line 42 and the parallel bottom edge 34 of blank 26. Each pair of brace panels 48 is provided with a dogleg shape by a pair of cut lines 50 which extend from bottom edge 34 toward cut line 42 and then intersect a transversely extending cut line 52. The cut lines 50 are inclined from the adjacent fold line 40 so that an acute angle is formed by such lines. A short cut line 54 extends between parallel cut lines 52 and 42 to permit separation of the braces 48 from each other within each pair of braces.

It can be seen that cut lines 50 and 52 and edge 34 also define a trapezoidal panel 56 which can be completely removed from the blank 26. Panel 56 includes two parallel fold lines 58 and 60 as well as a slot 57 which extends into the panel from cut line 52.

A pair of elongated panels 58 which form the outer front and back sides of the tray portion 18 of the assembled stand 12 extend between the end panels 28 in blank 26. Cut line 42 defines one major side of the front and back panels 58 and a parallel fold line 60 defines the other major side. Fold lines 60 and 32 form a generally straight line such that the top edge of panels 58 lie in the same plane as the top edge of end panels 28 in the assembled stand 12. The minor ends of the front and back panels are formed by a portion of fold lines 30.

A pair of inner front and back panels 62 having generally the same dimensions as the outer panels 58 are joined to panels 58 along fold lines 60. The inner panels form the front and back inner sides of the tray 18 and are formed by a fold line 64 which is parallel to line 60 and a series of cutouts 66 which extend into the blank from an irregular top edge 68 thereof. An end of one of the panels is formed by the side edge of the blank opposite from edge 36.

Flaps 70 form the bottom of the tray portion of stand 20 are joined to inner panels 62 along fold lines 64. The ends of the flaps are defined by cutouts 66 and the side edge of the blank. The free major side of the flaps 70 is defined by the top edge 68 of the blank and includes a slight jog 72. A slot 74 is formed in each end of the flaps 70 for a purpose which will be subsequently described. Similar slots 75*a* are also formed along fold lines 42 and spaced apart cutouts 75*b* are provided in the bottom edge 34 of the blank 26.

The inner ends of the tray portion 18 are formed by panels broadly defined by the numeral 76 which are joined along fold lines 32 with outer end panels 28. Panels 76 include a hinge line 78 which is closely spaced from and parallel to just mentioned fold lines 32. Another parallel hinge line 80 is spaced from hinge line 78 to define a shelf panel 82 therebetween. A still further hinge line 84 is provided near the top edge 68 to which define one major side of a sliding tab 85, the other major side being part of the top edge of the blank. A pair of shelf supports 86 are formed in the panel portion between hinge lines 80 and 84. The supports 86 are defined by hinges 88 which extend between lines 80 and 84 and a center cut line 90 that also extends between those lines. Those portions of lines 80 and 84 that define the supports 86 are cut lines to permit swinging of the supports about hinges 88, that portion of line 84 also being cut in a slight v-shape so that the bottoms of the supports lie flat along the bottom of the tray portion when the stand is assembled. A pair of thumb hole openings 92 are provided adjacent the supports 86.

Figure 8:
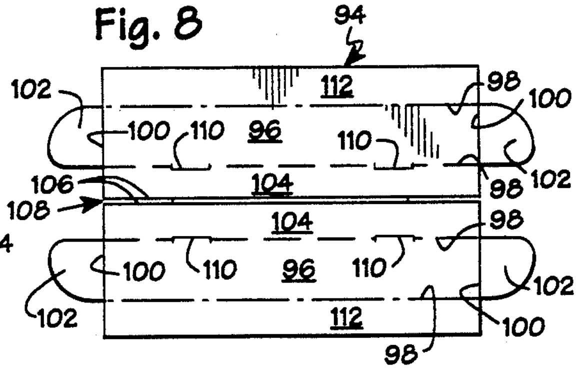
FIG. 8 is a top plan view on the scale of FIG. 7 of a second flat blank which may befolded to form the remaining portion of the stand.

Turning additionally to FIG. 8, a flat blank 94 which is used in conjunction with previously described blank 26 to form the assembled stand 20 will now be described. Blank 94 serves primarily to stiffen the assembled stand and reinforces the bottom of the tray portion 18 so that it can support the weight of the musical instrument.

Blank 94 includes a pair of rectangular bottom support panels 96 defined by spaced apart major fold lines 98 and minor fold lines 100. Each bottom panel 96 includes an arcuate tuck flap 102 at both ends along minor fold lines 100. Each bottom panel 96 is also joined along the major fold line 98 closest to the other panel 96 to an elongated beam panel 104. Closely spaced major fold lines 106 separate the beam panels 104 from each other and slots 108 extend inwardly from the edges of the blank along the fold lines 106. A pair of tabs 110 are positioned along the fold lines 98 which define the other major side of the ridge panels 104 and are formed by a cut line that separates the tap from the center beam panel 104 when that panel is folded along line 98. A side flap 112 is joined to each support panel 96 along the major fold line 98 opposite from ridge panel 104 to complete the blank 94.

Figure 9:
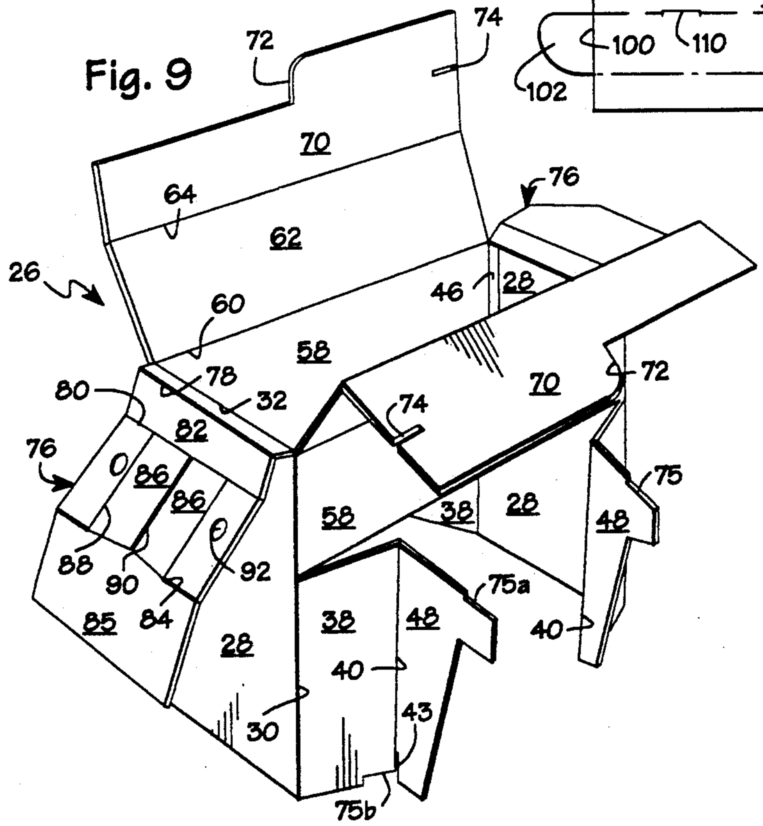
FIG. 9 is a perspective view of the blank of FIG. 7 shown partially folded to illustrate the process for folding the blank to form a portion of the stand.

To assemble the blanks 26 and 94 into stand 12, the trapezoidal panels 56 shown in FIG. 7 may first be removed from blank 26 along cut lines 50 and 52. The brace panels 48 may also be separated from each other along cut lines 54 and together with inner end panels 38 may be separated from front and back panels 58 along cut line 42 at this time. The blank may then be folded along lines 30 to form the box shape of the stand as shown in FIG. 9. An adhesive applied to glue tab 46 permits the tab to be secured to the inner face of the adjacent outer end panel 28 to maintain the box shape of the stand. It will be appreciated that the tab 46 and panel 28 may be releasably secured together, such as by Velcro type hook and loop elements to permit the blank to be returned to its flat condition when desired.

The support legs 20 of the stand are formed next by folding the inner end panels 38 against the inner face of the associated outer end panel 28. The brace panels 48 are thereby also folded along fold lines 40 to extend orthogonally from the end panels.

Figure 3:
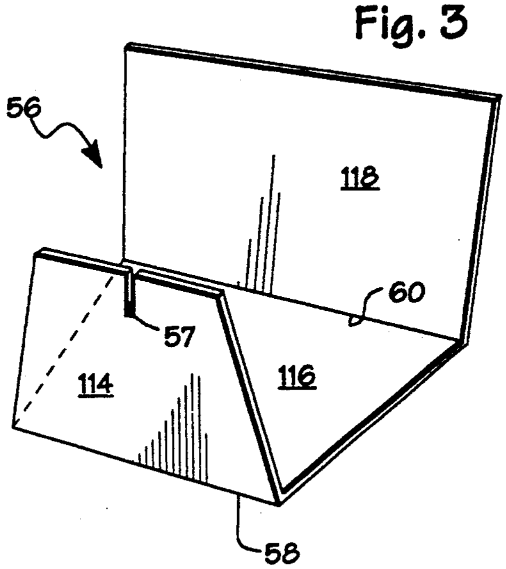
FIG. 3 is a perspective view on an enlarged scale of a foot panel forming part of the stand.

As shown in FIG. 3, the trapezoidal panel 56 when removed from .the blank 26 and folded along lines 58 and 60 forms three flaps. 114, 116 and 118. Flaps 114 and 118 are folded upright along lines 58 and 60 and flap 118 is then folded flat against flap 116. Flap 114 is then folded toward 118 but spaced slightly therefrom to permit the folded flaps 116 and 118 to be inserted into the recess formed between inner leg panel 38 and outer end panel 28 with flap 114 being positioned outside of panel 38 as shown in FIG. 1. The slot 57 in flap i14 interlocks with slots 43 formed along fold line 40 to maintain alignment of the bottom portion of panels 38 in a common plane.

Figure 2:
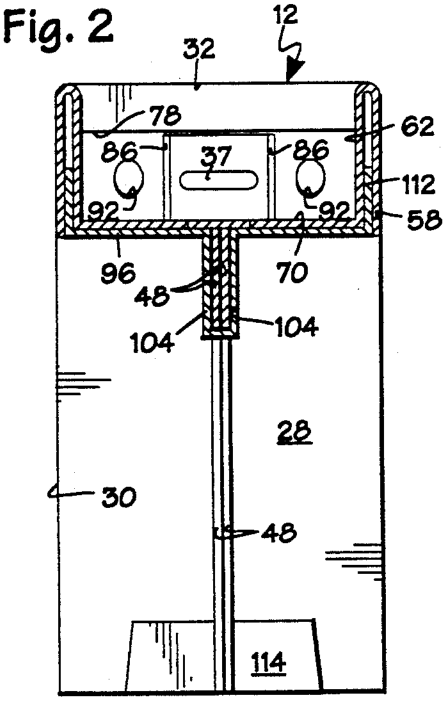
FIG. 2 is an end elevational view of the stand taken in vertical section along line 2—2 of FIG. 1 in the direction of the arrows.
Figure 10:
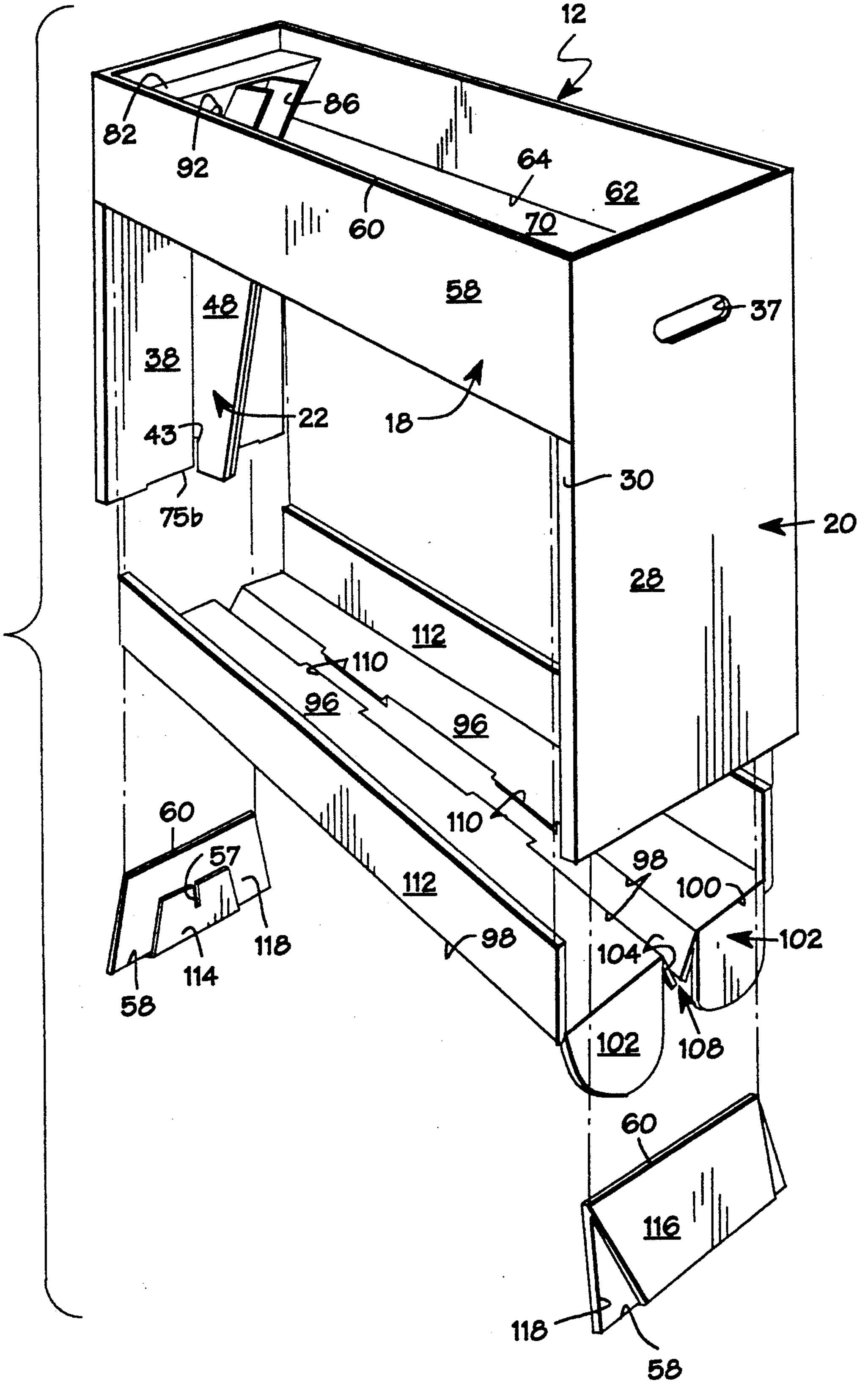
FIG. 10 is an exploded perspective view of the music stand to illustrate its separate components.

The other blank 94 shown in FIG. 8 may now be prepared by folding the various panels 96 and 104 and flaps 102 and 112 along their respective fold lines. As can be seen in FIG. 10, the ridge panels 104 are thus placed in facing and but slightly spaced apart relation, with the side flaps 112 extending orthogonally to the plane of the bottom support panels 96 in an upright direction. The tuck flaps 102 also extend orthogonally to that plane but in a downward direction. The folded blank 94 is then moved upwardly from beneath the partially folded other blank 26 to mate therewith. When the panels are properly positioned, the dogleg portion of the brace panels 48 from blank 26 are received within the recess formed between the folded beam panels 104 (as shown in the completed stand of FIG. 2), the other portion of the brace panels being positioned in slots 108.

The tuck flaps 102 are then inserted into the recess formed between the inner and outer end panels 28 and 38 by first pivoting the bottom support panels upward along the fold lines 98 that include tabs 110 to permit insertion of the tuck flaps into the recess and then returning the support panels back to their horizontal position to fully seat the flaps within the recess. The tuck flaps 102 in their seated position thus prevent downward movement of the bottom support panels 96. Additional support for those panels 96 is provided by the tabs 110 resting on the top of brace panels 48 in cutouts 75*a*.

Once the folded blank 94 has been positioned as described above, the tray portion of the stand 20 may be formed by continuing the folding of blank 26. The front and back panels 62 are folded inwardly along lines 60 onto panels 58 to form the inner front and back of the tray 18. The bottom panels 70 are likewise folded along lines 64 to rest on top of the bottom support panels 96 to form the bottom of the tray.

Figure 5:
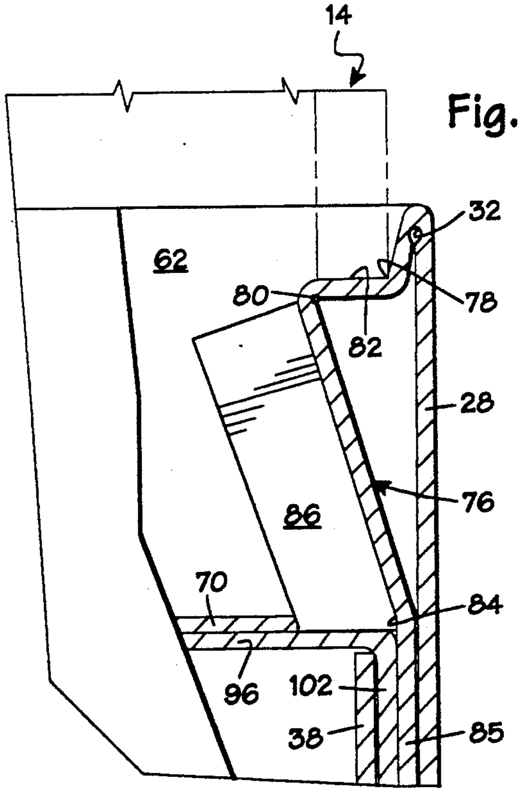
FIG. 5 is an enlarged fragmentary front elevational view of a portion of the stand with a portion of the stand broken away for purposes of showing the foldable shelf in its support position, and with the xylophone shown fragmentally in phantom lines.
Figure 6:
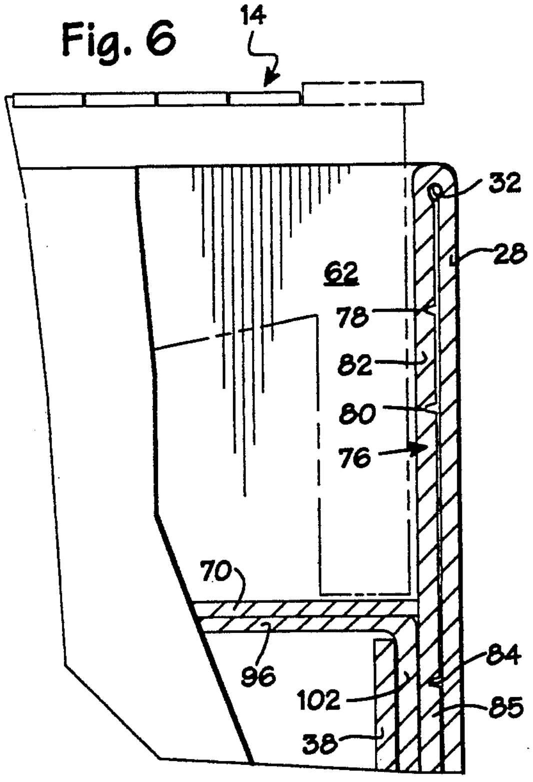
FIG. 6 is an enlarged fragmentary front elevational view of a portion of the stand with a portion broken away and similar to the view shown in FIG. 5 but with the foldable shelf shown in its retracted position and with the xylophone shown in phantom lines resting on the bottom of the tray portion of the stand.

The inner end panels 76 may then be folded inwardly along fold lines 32 to complete the tray. The hinge lines 78, 80 and 84 allow the panels 76 to be maneuvered to insert the sliding tabs 85 into the recess formed between the inner leg panels 38 and outer end panels 28. As can be seen in FIGS. 4-6, the sliding tabs thus lie between the tuck flaps 102 and the outer end panels 28.

As seen particularly in FIG. 6, the inner panel 76 of the tray portion may be positioned flat against the outer panel 28 to permit the musical instrument 22 to be supported on the bottom portion of tray 18 formed by panels 70. Alternately, the inner panel. 76 may be positioned as shown in FIG. 5 to support the instrument 22 at an elevated height on the shelf panels 82. Hinge lines 78, 80 and 82 allow the shelf to be placed in that horizontal position extending into the tray opening and shelf supports 86 are then swung about hinges 88 and nest in slots 74 formed in bottom panels 70 to lock the shelf in the extended position. The thumbholes 92 provided in the panel 76 allow the panel 76 to be easily grasped to move the panel between its two positions.

It can thus be seen that blanks 26 and 94 may be readily folded and joined together to form stand 12. The tray portion 18 of the stand 12 has a depth and rectangular configuration that will accommodate box-shaped musical instruments such as xylophones 14 as well as keyboards and the like. The bottom 70 of the tray will securely support the weight of the instrument. The bottom 70 is in turn supported by the underlying support panels 96 which are held in place by the interaction of the tuck flaps 102 with the inner leg panels 38. In addition tabs 110 rest on the cutouts 75*a* of the brace panels 48 to further aid in the distribution of the load of the instrument to the wide support legs 20.

Wobbling of the stand 12 is also substantially reduced by the use of beam 24 formed by panels 104 and the leg braces 22 formed by panels 48. The beam 24 and braces 22 rigidly connect the legs 20 together to provide the rigid structure of the stand. End to end as well as front to back movement of the stand is controlled by this arrangement and the wide support legs 20 further reduce undesired front to back movement. It will also be appreciated that the beam 24 adds to the load bearing capacity of the bottom 70 of the tray portion 18.

Notably, the inner end panels 76 may be maneuvered to provide shelves 82 which allow the instrument 14 to be supported at an elevated position on the tray 18. The shelves 82 are formed by simply grasping the thumbholes 92 to raise the end panel 76 from its position shown in FIG. 6 to the position shown in FIGS. 4 and 5. The hinge lines 78, 80 and 84 cause the shelves 82 to extend into the interior of the tray in a plane spaced above that defined by bottom panels 70 and parallel thereto. The supports 86 may then be swung about hinges 88 and locked into slots 74 to maintain the shelves in the desired extended position. The instrument may then be supported directly on the upper surface of shelves 82 or on a rigid member (not shown) which may be used to span between the shelves. The shelves may be returned to their retracted position by simply folding supports 86 and pushing the panel 76 flat against the outer end panel 28.

It can thus be seen that the stand 12 provides a lightweight but rigid support for musical instruments and can easily be transported in either its assembled condition or can be quickly disassembled for transport in a flattened condition. The stand also provides two different support heights for the instrument so that the instrument can be played either while standing or while seated.

From the foregoing, it will be seen that this invention is one well adapted to attain all the ends and objects hereinabove set forth as well as other advantages which will be apparent to those skilled in the art.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus desribed the invention, what is claimed is:

1. A stand formed of folded paperboard or similar material and having a tray supported by spaced apart legs, said stand comprising:

- generally flat outer end panels forming first and second ends of the tray and at least a portion of said legs, said outer end panels formed by folding a unitary blank of paperboard or similar material;
- front and back panels connected to the outer end panels along fold lines and forming a front and back of the tray;
- a bottom panel connected to one of said front and back panels along a fold line and forming at least a portion of a bottom of the tray;
- inner leg panels joined to the outer end panels and folded against a lower portion of the outer end panels along fold lines; and
- a reinforcing panel underlying said bottom panel, said reinforcing panel formed from folding a second blank of paperboard or similar material, said reinforcing panel including downwardly folded tuck flaps inserted into a recess formed between said folded inner leg panels and said outer end panels.

2. The stand of claim 1, wherein said reinforcing panel includes first panels lying in a common plane and contacting said bottom panel along an undersurface thereof and intermediate panels joined along fold lines to the first panels and folded in facing relation to each other and extending orthogonally to the plane of the first panels.

3. The stand of claim 3, including leg brace panels joined to the inner leg panels along fold lines, said leg brace panels including a tab portion inserted between a recess formed between said folded intermediate panels of said reinforcing panel.

4. The stand of claim 3, including inner end panels disposed within the tray and connected to said outer end panels at said first and second ends along fold lines, said inner end panels including spaced apart hinge lines permitting a shelf to be formed in each of said inner end panels and placed in a generally horizontally extended position and wherein said hinge lines permit said shelf to be moved to a retracted position.

5. The stand of claim 4, including a lower sliding tab portion formed by a hinge line in each of said inner end panels below said shelf, said lower sliding tab portion being slidably received within said recess formed between said folded inner leg panels and said outer end panels.

6. The stand of claim 5, including a shelf support formed in said inner end panel between said shelf and said lower sliding tab portion, said shelf support being movable about a hinge line to contact one of said bottom panel or said reinforcing panel to brace said shelf when in the shelf is in said extended position.

7. A stand for holding muscial instruments and including a tray supported by spaced apart legs, said tray and legs formed of folded paperboard or similar material, said stand comprising:

- generally flat outer end panels forming first and second ends of the tray and at least a portion of said legs, said outer end panels formed by folding a unitary blank of paperboard or similar material;
- front and back panels connected to the outer end panels along fold lines and forming a front and back of the tray;
- inner end panels disposed within the tray and connected to said outer end panels at said first and second ends along fold lines, said inenr end panels including spaced apart hinge lines permitting a shelf to be formed in each of said inner end panels and placed in a generally horizontally extended position and wherein said hinge lines permit said shelf to be moved to a retracted position;
- a bottom panel connected to one of said front and back panels along a fold line and forming at least a portion of a bottom of the tray; and
- inner leg panels joined to the outer end panels and folded against a lower portion of the outer end panels along fold lines.

8. The stand of claim 7, including a lower sliding tab portion formed by a hinge line in each of said inner end panels below said shelf, said lower sliding tab portion being slidably received within a recess formed between said folded inner leg panels and said outer end panels.

9. The stand of claim 8, including a shelf support formed ins aid inner end panel between said shelf and said lower sliding tab portion,s aid shelf support being movable about a hinge line to contact one of said bottom panel or said reinforcing panel to brace said shelf when in the shelf is in said extended position.

10. The stand of claim 7, including a reinforcing panel underlying said bottom panel and including tuck flaps inserted into a recess formed between said folded inner leg panels and said outer end panels, said reinforcing panel formed from folding a second unitary blank of paperboard or similar material.

11. The stand of claim 10, wherein said reinforcing panel includes first panels lying in a common plane and contacting said bottom panel along an undersurface thereof and intermediate panels joined along fold lines to the first panels and folded in facing relation to each other and extending orthogonally to the plane of the first panels.

12. The stand of claim 11, including leg brace panels joined to the inner leg panels along fold lines, said leg brace panels including a tab portion inserted between a recess formed between said folded intermediate panels of said reinforcing panel.

13. A unitary blank of paperboard or like material for folding to form a stand having a tray supported by spaced apart legs, said blank comprising:

- a first generally rectangular outer end panel having opposed side edges and opposed top and bottom edges, said outer end panel forming an end of said tray and a portion of one of said legs when said blank is folded to form said stand;
- a second generally rectangular outer end panel having opposed side edges and opposed top and bottom edges, said second outer end panel forming another end of said tray and a portion of the other of said legs when said blank is folded to form said stand;
- a front panel connected at one end thereof to a portion of one of said side edges of said first outer end panel along a first fold line, the other end of said front panel being connected to a portion of the one of said side edges of said second outer end panel along a second fold line;
- a rear panel connected at one end thereof to a portion of the other of said side edges of said first outer end panel along a third fold line, said rear panel being connectable at the other end thereof to a portion of said other side edge of said second outer end panel when said blank is folded to form said stand, wherein said front and rear panels form the front and rear sides of said tray;
- a first inner end panel connected to said top edge of the first outer end panel along a fourth fold line and foldable to form an inner end of said tray;
- a second inner end panel connected to said top edge of the second outer end panel along a fifth fold line and foldable to form another inner end of said tray, said first and second inner end panels including spaced apart higne lines for forming extendable and retractable shelves within said tray when the blank is folded to form said stand;
- inner leg panels joined at side edges thereof to another portion of side edges of said first and second outer end panels along fold lines; and
- leg brace panels connected to other side edges of said inner leg panels along other fold lines.

14. The blank of claim 13, including cut and hinge lines in both fo said first and second inner end panels to form foldable supports for bracing said shelves when extended.

15. The blank of claim 14 including an inner front panel connected to a top edge of said front panel along a fold line and a bottom panel connected to a top edge of said inner front panel along another fold line, and including a rear inner panel connected to a top edge of said rear panel along a fold line, said inner front, rear and bottom panels being separated from an adjacent inner end panel by cut lines.

16. The blank of claim 13, including a second unitary blank of paperboard or like material and comprising a pair of first reinforcing panels joined to intermediate panels along fold lines permitting the intermediate panels to be folded into facing relation with the first reinforcing panels lying in a common plane orthogonal to the folded intermediate panels, said reinforcing and intermediate panels being configured to be joined to the first blank to underlie and reinforce said tray when said first blank is folded to form said stand.

* * * * *